3,234,253
TWO-STAGE PHOSGENATION PROCESS FOR PREPARING AROMATIC ISOCYANATES
John Richard Cooper, Hockessin, Del., assignor to E. I. du Pont de Nemours and Company, Wilmington, Del., a corporation of Delaware
No Drawing. Filed Sept. 6, 1962, Ser. No. 221,907
13 Claims. (Cl. 260—453)

This invention relates to an improved process for the preparation of aromatic mono-, di-, and polyisocyanates from the corresponding aromatic amines.

The preparation of aromatic isocyanates by the phosgenation of aromatic amines is a well-known process. The phosgenation is generally carried out in 2 steps or stages. In the first stage, a solution or suspension of aromatic amine in an inert solvent is contacted with an excess of phosgene gas or phosgene dissolved in an inert solvent at relatively low temperatures usually less than 90° C. In this first step of the reaction, the aromatic amine is converted to a variety of products some of which are intermediate between the starting amine and the desired isocyanate. The slurry containing intermediate products in the inert solvent is heated to an elevated temperature in the second stage in the presence of a new excess of phosgene or in the presence of the mixture of HCl and phosgene evolved from the first stage of the reaction. The temperatures employed in the second stage of the reaction should be sufficiently high to break down carbamyl chloride and to convert it and other intermediate products to the desired isocyanate. Temperatures in the range of 100–200° C. are generally employed in the second stage of the reaction.

The process described above is capable of producing good yields of aromatic mono-, di-, and polyisocyanates, especially if low concentrations of amine in the inert solvent are employed in the first reaction stage. When, however, the concentration of amine in the inert solvent is increased in an attempt to increase production rates, the overall yield of isocyanate is decreased markedly. As a result of this decreased yield, the residues produced as by-products during phosgenation increase to aggravate the already difficult task of separating the desired isocyanate therefrom, the residue being essentially non-volatile. Concurrently, at the low temperatures usually employed in the first reaction stage, the reaction slurry may become sufficiently viscous from increased insoluble intermediate products so as to be difficult to agitate or transfer. In the commercial manufacture of organic aromatic isocyanates, the viscous nature of the reaction slurry in the first stage may present serious mechanical problems.

It is therefore an object of this invention to provide a phosgenation process for the preparation of aromatic isocyanates in which improved yields of the isocyanate are obtained for a given concentration of amine reactant.

It is another object of the present invention to provide a phosgenation process for the preparation of aromatic isocyanates in which yields thereof are less sensitive to variations in concentration of amine reactant.

It is a further object of this invention to provide the improved phosgenation process of above with the additional improvement of reduced viscosity of the reaction slurry in the first reaction stage. These and other objects will appear hereinafter.

These and other objects are accomplished when the first reaction zone is heated to a temperature greater than 90° C. and preferably above 100° C. during phosgenation of an aromatic primary mono-, di-, or polyamine in an inert solvent to form a reaction mass containing the corresponding isocyanate and intermediates and when the reaction mass is transferred to a second reaction zone and contacted with phosgene and with hydrogen chloride, the latter in a greater concentration than that theoretically formed during the phosgenation of said amine in the first reaction zone.

It has been customary in the past to carry out the phosgenation in the second reaction stage by means of a new excess of phosgene or by passing all of the off-gas from the first stage phosgenation into the second reaction stage. By either method, additional hydrogen chloride must be added to the second stage so that the concentration of hydrogen chloride in the gaseous mixture of hydrogen chloride and phosgene which is employed in the second stage of the present invention exceeds the concentration of hydrogen chloride which would be present in the off-gas from the primary stage of the phosgenation if each amine group fed to the primary stage reacted with 1 mole of phosgene to produce 1 isocyanate group and 2 moles of hydrogen chloride. This is expressed by requiring that the mixture of phosgene and hydrogen chloride employed in the second reaction stage must contain greater than $$\frac{200A}{A+P}$$

mole per cent of hydrogen chloride, wherein $A$=equivalents of amine fed to the first reaction stage and $P$=the moles of phosgene fed to the first reaction stage. Equivalents of amine is defined as the number of $-NH_2$ groups per mole of amine; hence one mole of diamine=2 equivalents.

In the present invention, improved yield of isocyanate over prior art phosgenation processes results when the concentration of hydrogen chloride present in the second reaction stage is in excess of that predicted by stoichiometry. Consequently, a representative embodiment of the invention is the process which comprises contacting and reacting at least one aromatic primary mono-, di-, or polyamine with an excess amount of phosgene in the presence of an inert organic solvent in a reaction zone to form a reaction mass composed of the solvent and the corresponding isocyanate and intermediates, passing the reaction mass resulting from the reaction occurring in the previous step into a different reaction zone before said reaction has been completed, and then contacting said reaction mass with a mixture of phosgene and hydrogen chloride with the proviso that the concentration of hydrogen chloride present is stoichiometrically greater than the concentration thereof calculated for the reaction between phosgene and said amine.

In the foregoing process, provision of temperatures of greater than that of the prior art in the first reaction zone are not necessary to obtain the improved yield of isocyanate, however, use of such temperatures is preferred to provide a slurry more easily transferred between reaction stages and more readily contacted and reacted with phosgene and hydrogen chloride in the second reaction zone. Hence in another representative embodiment of the present invention, at least one aromatic primary mono-, di-, or polyamines is contacted and reacted with an excess amount of phosgene in the presence of an inert organic solvent in a reaction zone heated to a temperature of at least 100° C. to form a reaction mass containing the corresponding isocyanate and intermediates, the reaction mass resulting from the reaction occurring in the previous step is passed into a different reaction zone before said reaction is completed, and said reaction mass is then contacted with a mixture of sufficient phosgene to complete said reaction and of hydrogen chloride in a concentration greater than $$\frac{200A}{A+P}$$

mole percent thereof wherein A=the equivalents of primary amine fed to the primary reaction zone and P=the number of moles of phosgene fed thereto. It is preferred that at least 1.25 moles of phosgene is furnished in the first reaction zone for each equivalent of amine. It is also preferred that the second reaction zone is operated at temperatures between 130 and 190° C.

In carrying out the process of the present invention, the required mixture of hydrogen chloride and phosgene for the secondary reaction zone can be obtained by adding hydrogen chloride gas to the off-gas from the first stage reactor or a new mixture of hydrogen chloride and phosgene can be prepared by mixing the individual components in the proper proportions. The mixture of gases is most economically obtained for commercial operation by introducing only a portion of the off-gas from the primary reaction zone into a gas stream which is recycled through the secondary reaction zone. By employing only a portion of the primary reaction zone, off-gases in the secondary reaction zone, the composition of the gas will be shifted toward pure hydrogen chloride since some of the phosgene present is consumed in the secondary reaction zone. Naturally, the quantity of gas transferred from the primary reaction zone to the secondary reaction zone must be great enough that phosgene to complete the phosgenation reaction is available.

Any equipment which is normally satisfactory for the preparation of isocyanates by a two-stage process is satisfactory for carrying out the process of the present invention with only limited modification. The first stage of the phosgenation may be carried out in an agitate kettle equipped with a phosgene inlet located near the bottom. Alternatively, the first stage may be agitated by gas sparging. The phosgene may be added as a gas or as a solution in an inert solvent. In addition, the vessel should be equipped with an inlet for the amine solution and an overflow outlet through which the reaction slurry from the primary reactor can be transferred to the secondary reaction zone. This overflow may be designed so that gases evolved in the primary reactor are transferred to the secondary reaction zone along with the liquid reaction mass from the primary reactor. If only the liquid reaction mass is transferred, the primary reactor must be equipped with a gas vent through which off-gases consisting of phosgene and hydrogen chloride pass to phosgene recovery equipment or into the secondary reaction zone.

As previously indicated, the most economical method for carrying out the improved process of this invention involves recycling only a portion of the off-gas from the primary reactor through the secondary reactor with the remaining primary off-gas going to a phosgene recovery unit. Mixing of the amine solution with phosgene or a solution of phosgene may also be carried out in other types of equipment such as centrifugal pumps, turbomixers, and pipeline reactors.

The second stage of the phosgenation may be carried out in a kettle, but the requirements for agitation are not as stringent as those in the first sage. In addition to have an inlet for the reaction mass or the reaction mass plus off-gass coming from the primary reaction zone, the vessel employed as a secondary reaction zone must be equipped with a gas inlet, preferably near the bottom of the kettle, and with a vent for off-gases. Usually this vent should be equiped with a condenser so that solvent vapors accompaying the off-gases will be returned to the secondary reaction zone. A condenser is generally more important on the secondary reactor than on the primary reactor because the secondary reaction zone is maintained at a higher temperature so that the partial pressure of the solvent is greater. In addition to agitated kettles, pipeline reactors, packed towers, and recirculating reactors may also be used as equipment for the secondary reaction zone. For example, equipment such as that shown in FIGURE 2 of U.S. Patent 2,680,127 is representative of the type of equipment which may be used satisfactorily in the process of the present invention as long as provision is made to introduce additional hydrogen chloride gas into the secondary reaction zone.

At least about 1.25 moles of phosgene should be employed per equivalent of amine fed to the primary reactor. In other words, at least 1.25 moles of phosgene should be fed for each mole of an aromatic monoamine such as aniline and 2.50 moles of phosgene should be used with each mole of an aromatic diamine such as m-tolylenediamine. While the process can be operated with this limited excess of phosgene, improved yields are obtained if 1.75 to 2 moles of phosgene are employed per equivalent of amine. Thus in producing a diisocyanate such as toluene diisocyanate, it is desirable to use 3.5 to 4 moles of phos gene per mole of diamine. Greater quantities of phosgene can be employed, but this is generally uneconomical for the increase in yield is insignificant.

The quantity of phosgene which should be employed in the secondary reactor in the form of a mixture of phosgene and hydrogen chloride depends to a large extent on degree of completion of reaction or conversion reached in the primary reaction zone.

Hold-up time, agitation and temperature affect the degree of completion in the first zone. The initial reaction of phosgene with the amine is fast enough at relatively low temperatures to approach ultimate conversion within a matter of seconds. At higher temperatures, the initial reaction of amine occurs even more rapidly. Ensuing reactions at both high and low temperatures, which eventually lead to the formation of isocyanate, proceed more slowly. Agitation of the reaction medium in the first stage is desirable for efficient first stage conversion, but overall yield in the present process does not depend to a large degree on first stage conversion, because of the second reaction stage and the conditions employed therein according to the process of the present invention.

A preferred set-up for two-stage phosgenation consists of a first stage reactor which gives a relatively low conversion and a second stage reactor which may demand up to 0.25 mole of phosgene per equivalent of amine fed to the primary reactor. Naturally, sufficient phosgene must be present in the secondary reaction zone to complete the conversion to isocyanate of the intermediate products produced in the primary reaction zone. While greater excesses of phosgene can be employed in the secondary reaction zone, in accordance with the present invention, the phosgene must be used in the form of a mixture containing more hydrogen chloride than would be present by stoichiometric calculation in the off-gas from the primary reaction stage so that the volume of gas involved may be relatively large. The gas mixture employed in the secondary reactor may approach pure hydrogen chloride, as long as sufficient phosgene is furnished to complete the reaction; but again, practical limitations set by the amount of gas which must be handled will usually require the use of a gas mixture containing a substantial proportion of phosgene.

A wide range of temperatures may be employed in the first stage of the present phosgenation process. In the past, it has been customary to operate the first stage phosgenation at low temperatures ranging from about −20 to 90° C. If high concentrations of amine in inert solvent are employed at these lower temperatures, thick slurries which are difficult to handle mechanically may be formed. In order to avoid this problem and permit the use of high concentrations of amine in the inert solvent, it is desirable to operate the present process at a first stage temperature in the range of above 90 to 120° C. Temperatures up to about 170° C. can be employed and although some yield improvement is still obtained by the present process, much more significant results are obtained in the lower preferred temperature range.

Temperatures of about 100 to 110° C. are especially preferred if the solubility of the amine in the inert solvent permits operation at these temperatures. If the amine is of limited solubility, it is usually desirable to operate at higher temperatures rather than to use a slurry of amine in the solvent. When the first stage reaction between phosgene and amine is carried out in the preferred temperature range, a thin slurry of intermediate reaction products is formed which is easily transferred and handled mechanically. Operation at temperatures in the range of 100 to 110° C. also minimizes the need for cooling the first stage of the phosgenation.

In general, the temperature employed in the secondary reactor should be as high as possible, depending on the solvent used. The useful temperature range in the second stage of the phosgenation varies from about 130 to 190° C. With most aromatic isocyanates, the preferred temperature range in the secondary reactor zone ranges from about 150 to 170° C. It should be pointed out that it is not absolutely necessary to operate the primary reaction zone at a lower temperature than the secondary reaction zone in order to observe a yield increase when employing the present process, even though it is desirable as indicated by the preferred temperature ranges. For example, in preparing toluene diisocyanate by phosgenation of meta-tolylenediamine in o-dichlorobenzene solution, at a temperature of 150° C. in both stages, use of the improved process of the present invention results in a 2% increase in yield of the desired diisocyanate.

The first stage of the present process may be operated at pressures up to about 5 atmospheres if desired. Elevated pressures increase the solubility of phosgene in the reaction mass and tend to simplify the dispersion of and increase the ease of solution of phosgene, especially if it is added as a gas. Operation at elevated pressures in the first stage has little effect on the overall yield of isocyanate produced. Excessive pressures are not desirable because of the safety hazards involved in handling phosgene under relatively high pressures. The first stage can be operated at reduced pressure, but this introduces unnecessary complications without any compensating advantages. The second stage of the process can also be operated at elevated pressures up to about 5 atmospheres. Excessive pressures are undesirable because they cause preferential solubility of phosgene to occur in the fluid reaction mass and thereby minimize the benefits which are obtained by treating the second stage reaction mass with a gas mixture containing more hydrogen chloride than that evolved from the first stage reactor. This reduces the yield improvement which is possible with the present process. A moderate pressure of the order of one atmosphere may be beneficial however, because it reduces the amount of solvent vapors which leave the second stage with evolved hydrogen chloride and phosgene, thus reducing the heat-load which the second-stage condenser must accommodate and also reducing the heat required to maintain temperature in the secondary reactor. As in the case of the primary reactor, the secondary reactor may be operated at reduced pressure if the proper temperatures can be maintained, but this results in undue complications for a relatively insignificant change in yield.

Any of the solvents which are normally useful in carrying out the phosgenation of aromatic amines can be used in the process of the present invention. Representative examples include xylene, chlorobenzene, o-dichlorobenzene, diethyl phthalate, anisole, and chlorinated diphenyl. Of these solvents, the halogenated benzenes, namely chlorobenzene, o-dichlorobenzene and 1,2,4-trichlorobenzene are especially preferred. A choice among the preferred solvents usually can be made based on the solubility of the amine and the relative boiling points of the isocyanate to be produced compared to solvent boiling point. In general, the solvent should be chosen so that it boils below the isocyanate to be produced and the difference in boiling point should be sufficient to facilitate separation of the solvent from the isocyanate; however, this is not necessary. o-Dichlorobenzene is often a useful solvent in the present process because it boils above the preferred temperature range for the second stage phosgenation.

The concentration of the amine in the inert solvent which may be employed in the present invention will usually be in the range of 5 to 25%. In general, the higher the concentration of amine, the lower the phosgenation yield that will be obtained. By adding excess hydrogen chloride to the second reaction stage, higher yields at increased amine concentration are obtained in comparison with prior art processes. Operation of the first stage at temperatures above 90° C. permits convenient processing at concentrations higher than those previously recommended. In the case of monoamines, concentrations approaching 25% may be used to advantage. In the case of diamines and polyamines, the concentration of the amine solution preferably should be adjusted so that the final concentration of isocyanate produced is in the range of 10 to 12%. If it is desirable to obtain the maximum possible production from a given set of equipment, the concentration of amine may be increased so that the resulting diisocyanate solution will have a concentration of about 20%. The yield obtained under these conditions will of course be lower than that which would be obtained if the final diisocyanate concentration were closer to 10%. If it is desirable to obtain the highest possible yield of isocyanate while suffering capacity losses, the concentration of the amine solution should be so adjusted that the final isocyanate concentration is of the order of about 5%. When phosgene is employed in the form of a solution in an inert solvent, allowances should be made in the concentration of amine solution so that the final concentration of isocyanate solution is in the range desired.

The residence time or holdup in the primary and secondary reaction zones which may be employed to advantage in the present process largely depend upon the temperatures employed in the two reaction zones. It is essential that the holdup or residence time employed in the primary reaction zone be of such limited duration that the phosgenation reaction will not go to completion in the primary reaction zone. This is true because certain intermediate phosgenation products produced in the primary reaction zone require the conditions existing in the secondary reaction zone for conversion to isocyanate in the highest possible yield. If the intermediate materials are allowed to remain in the primary reaction zone until they have reacted with phosgene, the over-all yield of isocyanate will be lowered, even though the reaction mass from the primary reaction zone is subjected to the action of hydrogen chloride and phosgene in the secondary reaction zone. Operating in the preferred temperature range of about 100° to 110° C. in the primary reaction zone, holdup times ranging from a few seconds up to about 30 minutes will give satisfactory results. If the holdup is prolonged beyond 30 minutes, some of the benefits derived from the secondary reaction zone will be lost. If the holdup in the primary reaction zone approaches 90 minutes, essentially all the yield improvement possible in the secondary reaction zone will be lost. At lower temperatures such as 80° C. or below, the holdup time in the primary reaction zone can be increased considerably without interfering with the effect of the secondary reaction zone on yield. At higher temperatures, on the order of 150° C., the holdup time in the primary reactor must be decreased down into the range of seconds to a few minutes if the desired effects on yield which are possible with the present process are to be obtained. The holdup time employed in the secondary reactor is not critical, but must be sufficient to permit conversion of intermediate products formed in the primary reactor to isocyanate. In the preferred temperature range of 150–170° C., times ranging from about 10–240 minutes are generally satisfactory. With higher temperatures up to about 190° C., conversion of the intermediate products to isocyanate can be completed more rapidly. Conversely, at temperatures below 150° C., the holdup time in the secondary reactor should be increased.

The process of the present invention may be employed to prepare mono-, di- and polyisocyanates corresponding to the aromatic primary mono-, di- or polyamines available. Mixtures of amines of the same degree of substitution and of different degrees of substitution with —NH$_2$ may also be employed. Representative monoisocyanates include phenyl isocyanate, o-tolyl isocyanate, p-tolyl isocyanate, p-chlorophenyl isocyanate, m-chlorophenyl isocyanate, 3,4-dichlorophenyl isocyanate, alpha-naphthyl isocyanate and 4-nitrophenyl isocyanate. Representative aromatic diisocyanates which can be produced by the present process include toluene-2,4-diisocyanate, toluene-2,6-diisocyanate, 1,3-phenylene diisocyanate, 1,4-phenylene diisocyanate, 1,5-naphthalene diisocyanate, cumene-2,4-diisocyanate, 4,4'-diisocyanatodiphenylmethane, 4,4'-diisocyanatodiphenylether, 4,4'-diisocyanatodiphenyl, 3,3-dimethyl-4,4'-diisocyanatodiphenylmethane. Representative aromatic polyisocyanates which may be made by the present process include such compounds as toluene-2,4,6-triisocyanate, 4,4',4''-triisocyanatotriphenylmethane and 2,4,4'-triisocyanatodiphenylether.

Representative examples of the present invention are as follows. Parts and percents are by weight unless otherwise indicated.

*Example 1*

Two agitated vessels connected in series are employed as primary and secondary reactors. The connection between the two reactors is such that the reaction mass from the primary reactor overflows into the secondary reactor along with the evolved hydrogen chloride and phosgene from the primary reactor. These materials are introduced into the secondary reactor by means of a dip-leg extending near the bottom of the secondary reactor. The first reactor is provided with separate inlets for amine solution and phosgene gas. It has no additional outlet other than that described above by means of which it is connected to the second reactor. The secondary reactor is equipped with a gas inlet by means of which phosgene, hydrogen chloride or mixtures thereof can be introduced in addition to the gas coming from the primary reactor. The secondary reactor is equipped with a liquid overflow through a U-leg so that gases evolved in the secondary reactor can be drawn off separately through a vent in the upper part of the vessel. The vent in the secondary reactor is connected to a reflux condenser so that solvent vapors in the gas stream may be returned to the reactor.

Phosgene gas and a solution of mixed isomers of tolylenediamine are introduced continuously into the first reaction zone. Phosgene is fed at a rate of about 79 parts per hour (0.798 mole) and the amine solution, consisting of 22 parts of a mixture of 80% by weight 2,4-tolylenediamine and 20% by weight 2,6-tolylenediamine dissolved in 253 parts of dichlorobenzene, is fed at a rate of about 275 parts per hour (0.18 mole of total amine). The first reaction zone has a volume such that it contains about 130 parts by weight of the liquid reaction mass formed by the prior introduction of phosgene and amine solution. The temperature of the reacting mass is maintained at about 105° C. The liquid reaction mass from the primary reaction zone overflows into the secondary reactor at a constant rate, approximately equal to the feed of the amine containing solution, so that the liquid level remains essentially constant in the primary reactor. As previously indicated, phosgene and evolved hydrogen chloride from the primary reactor are also transferred to the secondary reactor. The volume of the second reactor is such that it contains about 960 parts of the reaction mass from the primary reaction zone. It is maintained at a temperature of about 170° C. The composition of the gas leaving the primary reaction zone approaches 62 mole percent hydrogen chloride which is the theoretical limit of hydrogen chloride if all the diamine fed were converted to diisocyanate with the liberation of 4 moles of hydrogen chloride per mole of diamine. This limit is calculated by means of the expression $$\frac{200A}{A+P}$$

as follows:

$$\frac{200 \times \text{No. of } -\text{NH}_2 \text{groups in diamine}(2) \times 0.18}{(2 \times 0.18) + 0.798} =$$

62% (rounded off)

It does not reach this value because the residence time in the primary reactor is insufficient to permit complete reaction to occur. In addition to the gas from the primary reaction zone, about 40 parts per hour of phosgene is introduced into the second reactor. Including this additional phosgene, the calculated composition of the total gases fed to the secondary reaction zone approaches 46 mole percent hydrogen chloride. Once this system has come to equilibrium, an aliquot of the reaction mass leaving the secondary reactor is collected, degassed by refluxing to remove dissolved phosgene and hydrogen chloride, and totally distilled at reduced pressure to separate o-dichlorobenzene and toluene diisocyanate from non-volatile residue. The distillate is analyzed for toluene diisocyanate by means of ASTM assay procedure D–1638–60T, which involves reacting the diisocyanate with an excess of dibutylamine and titrating the unreacted amine with standard hydrochloric acid. Based on this assay and the amount of m-tolylenediamine feed corresponding to the aliquot of reaction mass taken for analysis, the yield of toluene diisocyanate is 91.6% of theory. Phosgene feed to the second reactor is stopped and it is replaced by the feed of about 18 parts per hour of hydrogen chloride. The system is allowed to reach equilibrium again. Under these conditions, the composition of the gas in the secondary reaction zone approaches 73.5 mole percent hydrogen chloride, well above the limit given by the expression $$\frac{200A}{A+P}$$

which has a value of 62% in this example. In the manner described above, a sample of the reaction mass from the secondary reactor is assayed for toluene diisocyanate. The yield is 94.3% of theory.

*Example 2*

Phosgene and the m-tolylenediamine solution described in Example 1 are fed to the first reactor of the equipment used in Example 1 at twice the rates employed in Example 1. The liquid reaction mass is allowed to overflow into the secondary reactor and the off-gases are also transferred thereto as in Example 1. However, hydrogen chloride is supplied to the secondary reactor at a rate of 18 parts per hour. The temperature in the first reactor is about 105° C.; in the second, 170° C. As in Example 1, the composition of the gas leaving the primary reaction zone approaches 62 mole percent hydrogen chloride, but the gas fed to the secondary reactor approaches 69 mole percent hydrogen chloride which exceeds the value of the expression $$\frac{200A}{A+P}$$

Following the procedure employed in Example 1, the yield to toluene diisocyanate is determined to be 95.5% of theory.

*Example 3*

Phosgene gas and a solution of 2,4-tolylenediamine are introduced continuously into the equipment described in Example 1. Phosgene is fed at a rate of about 65.3 parts per hour and the amine solution, consisting of 15.5 parts of 2,4-tolylenediamine dissolved in 253 parts of o-dichlorobenzene is fed at a rate of about 268.5 parts per hour. The first stage reactor is maintained at about 105° C. and the second stage, at about 170° C. No gas other than the off-gas from the first stage is introduced into the second stage. Under these conditions, the mole percent hydrogen chloride in the second stage approaches 55.6 and the concentration of toluene diisocyanate in the reaction mass leaving the second stage is about 7.5% by weight. The yield of toluene diisocyanate is 91.8% of theory.

When a more concentrated diamine solution, containing 28.6 parts of 2,4-tolylenediamine is 253 parts of o-dichlorobenzene, is fed to the system at a rate of about 281.6 parts per hour and the phosgene is correspondingly increased to 120.5 parts per hour, the concentration of toluene diisocyanate is raised to about 12.5% by weight in the o-dichlorobenzene leaving the second stage reactor. The mole percent of hydrogen chloride again approaches 55.6. The yield at this higher concentration is reduced from 91.8% down to 86.9% of theory, a difference of 4.9% absolute for a 5% increase in concentration.

Runs at the two concentrations used above are repeated, but hydrogen chloride is added to the second stage in addition to the off-gas from the first stage. At the low concentration, 17.8 parts per hour of hydrogen chloride are added; at the high concentration, 32.8 parts are added. In both cases, the concentration of hydrogen chloride in the second stage approaches 71 mole percent. At a concentration of about 7.5% by weight of toluene diisocyanate in the o-dichlorobenzene leaving the second stage, the yield of diisocyanate is 94.3% of theory. At the high concentration of about 12.5%, the yield is 90.7% of theory; a difference of 3.6% in absolute theory yield for a 5% increase in concentration. Thus, the improved process of the present invention not only produces higher yields at a given concentration of diisocyanate but in addition, shows a smaller yield decrease for a given increase in concentration.

*Example 4*

Phosgene and the m-tolylenediamine solution described in Example 1 are fed to the equipment employed in Example 1 at rates of 119 parts per hour and 275 parts per hour respectively. The temperature is again maintained at 105° C. in the primary reactor. The composition of the gas leaving the primary reactor approaches 46 mole percent hydrogen chloride in this example. The liquid reaction mass in the secondary reactor is treated at 170° C. with the gas from the primary reactor, without the use of additional phosgene or hydrogen chloride. The yield of toluene diisocyanate determined by the procedure employed in Example 1, is found to be 91.5% of theory.

When hydrogen chloride is supplied to the secondary reactor at a rate of 18 parts per hour along with the gas from the primary reactor the composition of the gas in the secondary reactor approaches 59 mole percent hydrogen chloride and the yield of toluene diisocyanate increases to 95.2% of theory. The value of 59, the mole percent hydrogen chloride, is well above the 46 mole percent limit calculated for the off-gas from the primary reactor by the expression $$\frac{200A}{A+P}$$

*Example 5*

The equipment employed in this example is similar to that used in Example 1 except that the primary reactor is equipped with a vent to permit the escape of excess phosgene and evolved hydrogen chloride in the first reactor and the overflow line connecting the first reactor to the second reactor is fitted with a U-leg so that gas from the primary reactor cannot enter the secondary reactor. Only the liquid reaction mass including suspended solids from the first reactor passes to the secondary reactor.

Phosgene and a solution of 22 parts of 2,4-tolylenediamine in 253 parts of o-dichlorobenzene are introduced into the first reactor at rates of 79 parts per hour and 275 parts per hour respectively. The composition of the gas from the primary reactor approaches 62 mole percent hydrogen chloride. The reaction mass in the primary reactor is introduced into the secondary reactor at a rate essentially corresponding to the feed rate of amine solution. Phosgene is introduced into the secondary reactor at a rate of about 20 parts per hour. The gas in the secondary reactor is mainly phosgene, but a trace of hydrogen chloride is present as a result of additional phosgenation occurring and also due to the presence of some dissolved hydrogen chloride in the fluid reaction mass entering from the primary reactor. The yield of toluene-2,4-diisocyanate is found to be 84.8% of theory. The temperature in the first reactor is about 105° C.; in the second, 170° C.

When hydrogen chloride is added to the secondary reaction at a rate of about 18 parts per hour in addition to the 20 parts per hour of phosgene, the yield of toluene-2,4-diisocyanate is 92.9% of theory. The composition of the gas employed in the secondary reactor under these conditions is about 71.5 mole percent hydrogen chloride, exceeding the value of $$\frac{200A}{A+P}$$

which is 62 mole percent hydrogen chloride for this example.

*Example 6*

The equipment employed in Example 5 is also used in this example. It again arranged so that only the liquid reaction mass from the primary reactor can enter the secondary reactor, and excess phosgene and hydrogen chloride from the primary reactor escape through a separate vent.

Phosgene and a solution of about 21 parts of aniline in 254 parts of o-dichlorobenzene are introduced into the first reactor at rates of 44.5 parts per hour and 275 parts per hour respectively. The temperature in the first reactor is maintained at about 105° C. The composition of the gas evolved from the primary reactor approaches 65.6 mole percent hydrogen chloride. The liquid reaction mass from the primary reactor is introduced into the secondary reactor at a rate essentially corresponding to the feed rate of amine solution. The secondary reactor is maintained at a temperature of about 170° C. When phosgene is introduced into the secondary reactor at a rate of about 20 parts per hour, the yield of phenyl isocyanate determined by the procedure employed in Example 1 for toluene diisocyanate, is 88.5% of theory. When hydrogen chloride is introduced into the second reactor at a rate of 19 parts per hour in addition to the phosgene feed of 20 parts per hour, the yield of phenyl isocyanate increases to 91.5% of theory. Under the first set of conditions, the composition of the gas in the secondary reactor approaches that of pure phosgene; while in the second case, the composition of the gas is about 69 mole percent hydrogen chloride which exceeds the value of the expression $$\frac{200A}{A+P}$$

which has a value of 65.6 mole percent hydrogen chloride in this example.

*Example 7*

The equipment employed in Example 5 is again used in this example. Phosgene and a solution of about 29 parts of 3,4-dichloroaniline in 246 parts of o-dichlorobenzene are introduced into the first reactor at rates of about 44.5 parts per hour and 275 parts per hour respectively. The temperature of the primary reaction zone is maintained at about 150° C. The fluid reaction mass from the primary reactor overflows into the secondary reactor corresponding to the feed rate of phosgene and amine solution employed. The secondary reactor is maintained at a temperature of about 178° C. When no additional gas, that is, either hydrogen chloride or phosgene, is added to the secondary zone, the yield of 3,4-dichlorophenyl isocyanate produced is 83.1% of theory.

Maintaining all conditions the same, phosgene is introduced into the secondary reactor at a rate of about 20 parts per hour. The yield of isocyanate under these conditions is 85.0%. If in addition to the 20 parts of phosgene per hour, hydrogen chloride is introduced at a rate of 18 parts per hour, the yield is increased to 89.0% of theory. Under these latter conditions, the composition of the gas fed to the secondary reactor approaches 69 mole percent hydrogen chloride which is in excess of the value required by the expression $$\frac{200A}{A+P}$$

This expression has a value of 57 mole percent hydrogen chloride in this example.

When the flow of phosgene and hydrogen chloride is continued to the second reactor, and all other conditions remain the same with the exception that the temperature in the primary reactor is lowered to 125° C., the yield of 3,4-dichlorophenyl-isocyanate is further increased to 90.4% of theory.

*Example 8*

The equipment employed in this example is the same as that used in Example 5. Phosgene and a solution of 19.5 parts of m-phenylenediamine in 255.5 parts of o-dichlorobenzene are introduced into the first reactor at rates of 79 parts per hour and 275 parts per hour respectively. The temperature of the first reactor is maintained at 100° C. The gas evolved from the primary reactor approaches 62 mole percent hydrogen chloride. The fluid reaction mass from the primary reactor is introduced into the secondary reactor at a rate essentially corresponding to the feed rate of m-phenylenediamine solution. The secondary reactor is maintained at a temperature of about 175° C. When only phosgene is introduced into the secondary reactor at a rate of about 20 parts per hour, the yield of 1,3-phenylene diisocyanate is 79.0% of theory. Under these conditions, the gas in the secondary reactor is largely phosgene. When hydrogen chloride is introduced at a rate of about 18 parts per hour in addition to the phosgene, the yield of 1,3-phenylene diisocyanate increases to 88.0% of theory. Under these conditions, the concentration of hydrogen chloride in the gas in the secondary reactor approaches 69 mole percent, well in excess of the value of the expression $$\frac{200A}{A+P}$$

which has a value of 62% for this example.

*Example 9*

The equipment employed in this example is identical in arrangement to that employed in Example 5, however, the size of the agitated vessels employed as primary and secondary reactors differs as described later in the example. Phosgene and a solution of mixed isomers of m-tolylenediamine are introduced continuously to the first reaction zone. Phosgene is fed at a rate of 15.9 parts per minute and the amine solution at a rate of 24 parts per minute. The amine solution consists of 16 parts of a mixture of 80% by weight 2,4-tolylenediamine and 20% by weight of 2,6-tolylenediamine dissolved in 84 parts of o-dichlorobenzene. An additional 18 parts per minute of o-dichlorobenzene is introduced with the phosgene. The first reaction zone has a volume such that it contains approximately 440 parts by weight of a liquid reaction mass formed by the prior introduction of phosgene and the amine solution. The temperature of the reacting mass is maintained at about 105° C. The fluid reaction mass from the primary reaction zone overflows into the secondary reactor at a constant rate essentially determined by the feed rate of amine solution to the primary reactor. The volume of the second reactor is such that it contains about 945 parts of the reaction mass from the primary reactor. The secondary reactor is maintained at a temperature of about 170° C. The composition of the gas leaving the primary reaction zone approaches 50.3% hydrogen chloride, the theoretical limit for the expression $$\frac{200A}{A+P}$$

When only 1.60 parts per minute of phosgene is introduced into the second reactor, the yield of toluene diisocyanate is 91.1% of theory. Under these conditions, the gas in the secondary reactor consists mainly of phosgene. When 0.88 part of hydrogen chloride gas is added in addition to the 1.60 parts of phosgene, the yield of toluene diisocyanate is increased to 93.9% of theory. Under these conditions the composition of the gas in the second stage is about 59.9 mole percent hydrogen chloride which is in excess of 50.3 mole percent hydrogen chloride, the value calculated by the expression $$\frac{200A}{A+P}$$

*Example 10*

Two-agitated vessels connected in series are employed as primary and secondary reactors. Both reactors are equipped with vents and reflux condensers such that condenser off-gas is at a temperature of about 30° C. The connection between the vessels is such that the liquid phase reaction mass from the first reactor overflows through a U-leg into the second reactor. The U-leg prevents gases from the primary reactor from entering the secondary reactor. Product from the secondary reactor overflows through a U-leg into a receiving tank. The vessels are vented through a common line so that the entire system can be held at a single elevated pressure, 30 p.s.i.g., in this example.

Phosgene gas and a solution of 2,4-tolylene diamine are introduced continuously into the first reaction zone. Phosgene is fed at a rate of about 52 parts per hour. Entering with the phosgene are about 74 parts per hour o-dichlorobenzene. A solution of 16 parts of a mixture of 80% by weight 2,4-tolylenediamine and 20% by weight 2,6-tolylenediamine in 84 parts o-dichlorobenzene is fed at a rate of about 77 parts per hour. The first reaction zone has a volume such that it contains about 18 parts by weight of the liquid reaction mass formed by prior introduction of phosgene and amine solution. The temperature of the reacting mass is maintained at about 105° C. The liquid reaction mass from the primary reactor zone overflows into the secondary reactor at a constant rate so that the liquid level remains essentially constant in the primary reactor. The calculated hydrogen chloride content of the off-gas from the primary reactor is 66.7%. A mixture of 77 parts of hydrogen chloride and 64 parts of phosgene gas are fed at a rate of about 8.5 parts per hour to the secondary reactor. This corresponds to 76.6 mole percent hydrogen chloride which exceeds the value of $$\frac{200A}{A+P}$$

of 66.7%. The secondary reactor is such that it contains about 33 parts of the reaction mass from the primary reaction zone. It is maintained at a temperature of about 170° C.

Once the system has come to equilibrium, an aliquot of the reaction mass from the secondary reaction zone is analyzed as in Example 1. The yield is 91% of theory.

When only phosgene is employed in the secondary reactor at a rate of 4 parts per hour, the yield of toluene diisocyanate is 87% of theory.

*Example 11*

A solution of about 9 parts of 2,4-tolylenediamine in 91 parts of o-dichlorobenzene is fed at a rate of 100 parts per hour into a well agitated reactor having a volume such that it contains about 16 parts of liquid reaction mass formed by prior introduction of reactants. In addition to the diamine solution, phosgene gas is introduced into the reactor at a rate of 29.2 parts per hour. The temperature in the reactor is maintained at 105° C. and a portion of the slurry overflowing the reactor is filtered and the filter cake is dried to determine the solids concentration in the reactor effluent. About 3.0% by weight is found by this procedure. When the reactor is operated at 120° C., the solids concentration drops to 1.4%. At 90° C., the solids concentration increase to about 5–6%. The viscosity of the slurry increases with increasing solids content and accordingly, decreases with increasing temperature.

Substantially the same results will be obtained by substitution of the amines, temperatures, pressures, and other operating conditions set-out in this specification in the foregoing examples, and accordingly the present invention is not limited thereto.

As many apparently widely different embodiments of this invention may be made without departing from the spirit and scope thereof, it is to be understood that this invention is not limited to the specific embodiments except as defined in the appended claims.

What is claimed is:

1. A process for the preparation of aromatic mono-, di- and polyisocyanates comprising the steps of contacting and reacting at least one primary amine selected from the group consisting of mono, di- and polyamines with an excess amount of phosgene in the presence of an inert organic solvent in a reaction zone heated to a temperature of from about −20° C. to about 170° C. to form a reaction mass containing the corresponding isocyanate and intermediates, passing the reaction mass into a different reaction zone heated to temperatures between 130° C. and 190° C., before the reaction of the previous step is completed, and then contacting said reaction mass with a mixture of phosgene and hydrogen chloride to convert said intermediates to the isocyanate corresponding to said primary amine with the proviso that said mixture contains greater than $$\frac{200A}{A+P}$$

mole percent of hydrogen chloride, wherein A=equivalents of amine fed to the first mentioned reaction zone and P=the moles of phosgene fed thereto.

2. Process of claim 1 in which the first mentioned reaction zone is maintained between 100° C. and 170° C.

3. The process of claim 1 wherein the said reaction zones are operated at pressures between 1 and 5 atmospheres inclusive.

4. The process of claim 1 wherein at least 1.25 moles of phosgene per equivalent of said primary amine is added to the first mentioned reaction zone.

5. The process of claim 1 wherein the inert organic solvent is o-dichlorobenzene.

6. The process of claim 1 wherein the primary amine is tolylenediamine.

7. The process of claim 6 wherein the tolylenediamine is a mixture of 80% by weight of 2,4-tolylenediamine and 20% by weight of 2,6-tolylenediamine.

8. The process of claim 1 wherein the primary amine is aniline.

9. The process of claim 1 wherein the primary amine is 3,4-dichloroaniline.

10. The process of claim 1 wherein the primary amine is 1,4-phenylenediamine.

11. The process of claim 1 wherein the primary amine is 4,4'-diaminodiphenylmethane.

12. The process of claim 1 wherein the primary amine is 3,3'-dimethyl-4,4'-diaminodiphenylmethane.

13. The process of claim 1 wherein the primary amine is m-phenylenediamine.

References Cited by the Examiner

UNITED STATES PATENTS 2,908,703   10/1959   Latourette _____ 260—453

CHARLES B. PARKER, *Primary Examiner.*